United States Patent
Ramos et al.

(10) Patent No.: US 12,488,801 B2
(45) Date of Patent: Dec. 2, 2025

(54) METHOD AND SYSTEM FOR PERSONALISING MACHINE LEARNING MODELS

(71) Applicant: SAMSUNG ELECTRONICS CO., LTD., Suwon-si (KR)

(72) Inventors: Alberto Gil C. P. Ramos, Staines (GB); Abhinav Mehrotra, Staines (GB); Sourav Bhattacharya, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 18/220,567

(22) Filed: Jul. 11, 2023

(65) Prior Publication Data
US 2023/0410818 A1 Dec. 21, 2023

Related U.S. Application Data

(63) Continuation of application No. PCT/KR2023/000693, filed on Jan. 13, 2023.

(30) Foreign Application Priority Data

Jun. 17, 2022 (EP) .................... 22179714

(51) Int. Cl.
*G10L 17/18* (2013.01)
*G10L 13/08* (2013.01)
(Continued)

(52) U.S. Cl.
CPC .............. *G10L 17/18* (2013.01); *G10L 13/08* (2013.01); *G10L 17/04* (2013.01); *G10L 21/0208* (2013.01)

(58) Field of Classification Search
CPC .... G01R 33/4806; G06F 17/18; G06N 3/045; G06N 3/08; G06N 3/084; G06N 20/00;
(Continued)

(56) References Cited

U.S. PATENT DOCUMENTS

| | | | |
|---|---|---|---|
| 9,345,412 B2 * | 5/2016 | Horne | ............... G01R 33/4806 |
| 11,676,579 B2 * | 6/2023 | Ward | ................... G06N 3/048 |
| | | | 704/232 |

(Continued)

FOREIGN PATENT DOCUMENTS

| | | |
|---|---|---|
| CN | 107785015 A | 3/2018 |
| CN | 109558827 A | 4/2019 |

(Continued)

OTHER PUBLICATIONS

Sherif Abdulatif et al., "Iinvestigating Cross-Domain Losses for Speech Enhancement", arXiv:2010.10468v1 [cs.SD], Oct. 20, 2020, 5 pages.

(Continued)

*Primary Examiner* — Gerald Gauthier
(74) *Attorney, Agent, or Firm* — Sughrue Mion, PLLC

(57) ABSTRACT

Broadly speaking, embodiments of the present techniques provide a method and system for personalising machine learning models on resource-constrained devices by using conditional neural networks. In particular, the present techniques allow for resource-efficient use of a conditioning vector by incorporating the conditioning vector into weights learned during training. This reduces the computational resources required at inference time.

13 Claims, 13 Drawing Sheets

(51) Int. Cl.
*G10L 17/04* (2013.01)
*G10L 21/0208* (2013.01)

(58) Field of Classification Search
CPC ...... G06N 3/044; G06N 3/0475; G06N 3/048;
G06N 3/0985; G06Q 40/08; G06T 11/00;
G06T 5/50; G10L 13/02; G10L 13/08;
G10L 15/02; G10L 15/063; G10L 15/16;
G10L 17/04; G10L 17/06; G10L 17/18;
G10L 21/0208; G10L 21/0232; G10L
25/30; G10L 25/90; H03M 7/00; H03M
7/60; G05B 23/0283; H04L 12/1827;
H04R 1/1016; H04R 25/507
See application file for complete search history.

(56) References Cited

U.S. PATENT DOCUMENTS

| | | | | |
|---|---|---|---|---|
| 11,783,813 | B1* | 10/2023 | Rafii | H04R 25/507 |
| | | | | 704/232 |
| 11,790,892 | B1* | 10/2023 | Kessler | G06N 3/0475 |
| | | | | 704/232 |
| 12,136,036 | B2* | 11/2024 | Sanchez | H03M 7/60 |
| 12,288,146 | B2* | 4/2025 | Michael | G05B 23/0283 |
| 2015/0154508 | A1 | 6/2015 | Chen | |
| 2018/0061397 | A1 | 3/2018 | Huang et al. | |
| 2018/0336887 | A1* | 11/2018 | Song | G06N 3/045 |
| 2019/0088251 | A1 | 3/2019 | Mun et al. | |
| 2019/0156837 | A1* | 5/2019 | Park | G10L 17/18 |
| 2019/0287261 | A1 | 9/2019 | De Los Santos et al. | |
| 2019/0354850 | A1* | 11/2019 | Watson | G06N 3/045 |
| 2020/0411032 | A1 | 12/2020 | van den Oord et al. | |
| 2021/0358095 | A1* | 11/2021 | Arroyo | G06T 11/00 |
| 2021/0365777 | A1 | 11/2021 | Izadi et al. | |
| 2021/0406695 | A1* | 12/2021 | Pandarinath | G06N 3/084 |
| 2022/0005457 | A1* | 1/2022 | Balakrishnan | G10L 15/16 |
| 2022/0139382 | A1* | 5/2022 | Shi | G10L 15/16 |
| | | | | 704/232 |
| 2022/0139383 | A1* | 5/2022 | Rose | H04L 12/1827 |
| | | | | 704/232 |
| 2022/0148051 | A1* | 5/2022 | Bagnall | G06Q 40/08 |
| 2022/0156646 | A1* | 5/2022 | Farrar | G06N 20/00 |
| 2022/0157297 | A1 | 5/2022 | Dey et al. | |
| 2022/0375462 | A1* | 11/2022 | Bhattacharya | G10L 21/0208 |
| 2022/0383100 | A1* | 12/2022 | Zhu | G06N 3/045 |
| 2023/0021338 | A1* | 1/2023 | Ahuja | G06N 3/0475 |
| 2023/0100303 | A1* | 3/2023 | Jain | G06N 3/045 |
| | | | | 706/15 |
| 2023/0104583 | A1* | 4/2023 | Bekker | G10L 15/063 |
| | | | | 704/232 |
| 2023/0110905 | A1* | 4/2023 | Shih | G10L 25/90 |
| | | | | 704/232 |
| 2023/0130253 | A1* | 4/2023 | Li | G10L 15/02 |
| | | | | 704/232 |
| 2023/0130844 | A1* | 4/2023 | de la Rey | G10L 25/30 |
| | | | | 704/232 |
| 2023/0169139 | A1* | 6/2023 | Baek | G06N 3/044 |
| | | | | 707/722 |
| 2023/0169329 | A1* | 6/2023 | Ramos | G06F 17/18 |
| | | | | 706/25 |
| 2023/0186903 | A1* | 6/2023 | Cui | G10L 15/063 |
| | | | | 704/232 |
| 2023/0186917 | A1* | 6/2023 | Volovich | H04R 1/1016 |
| | | | | 704/232 |
| 2023/0230609 | A1* | 7/2023 | Seetharaman | G10L 21/0232 |
| | | | | 704/232 |
| 2023/0260519 | A1* | 8/2023 | Medalion | G10L 17/06 |
| | | | | 704/232 |
| 2023/0267306 | A1* | 8/2023 | Eckart | G06N 3/045 |
| | | | | 706/12 |
| 2023/0410818 | A1* | 12/2023 | Ramos | G06N 3/045 |

FOREIGN PATENT DOCUMENTS

| | | |
|---|---|---|
| CN | 111738403 A | 10/2020 |
| CN | 112070209 A | 12/2020 |
| CN | 112418392 A | 2/2021 |
| CN | 108229652 B | 5/2021 |
| CN | 114048386 A | 2/2022 |
| GB | 2588689 A | 5/2021 |

OTHER PUBLICATIONS

Peter Bell et al., "Adaptation Algorithms for Neural Network-Based Speech Recognition: An Overview", IEEE Open Journal of Signal Processing, vol. 2, pp. 33-66, 2021.
Ting Chen et al. "On Self Modulation for Generative Adversarial Networks", ArXiv, abs/1810.01365, 2019, 18 pages.
Hyeong-Seok Choi et al., "Real-time Denoising and Dereverberation with Tiny Recurrent U-Net", Seoul National University, Supertone Inc., arXiv:2102.03207v1 [cs. SD], Feb. 5, 2021, 5 pages.
P. Comon et al., Handbook of Blind Source Separation: Independent Component Analysis and Applications, Book Review, IEEE, 2010, 65 pages.
Yanzhang He et al., "Streaming End-to-end Speech Recognition for Mobile Devices", IEEE International Conference on Acoustics, Speech and Signal Processing (ICASSP), 2019, pp. 6381-6385.
Yanxin Hu et al., DCCRN: Deep Complex Convolution Recurrent Network for Phase-Aware Speech Enhancement, Interspeech 2020, Aug. 1, 2020, 5 pages.
Umut Isik et al., "PoCoNet: Better Speech Enhancement with Frequency-Positional Embeddings, Semi-Supervised Conversational Data, and Biased Loss", Interspeech, 2020, 5 pages.
Tamara G. Kolda et al., "Tensor Decompositions and Applications", 2009 Society for Industrial and Applied Mathematics, SIAM Review, 2009, vol. 51. No. 3. pp. 455-500.
Max W. Y. Lam et al., "Effective Low-Cost Time-Domain Audio Separation Using Globally Attentive Locally Recurrent Networks", arXiv:2101.05014v1 [eess.AS], Jan. 13, 2021, 8 pages.
Yi Luo et al., "Ultra-Lightweight Speech Separation via Group Communication", Department of Electrical Engineering, Columbia University, arXiv:2011.08397v3 [eess.AS], Nov. 20, 2020, 5 pages.
Yi Luo et al., "Conv-TasNet: Surpassing Ideal Time-Frequency Magnitude Masking for Speech Separation", IEEE/ACM Transactions on Audio, Speech, and Language Processing, vol. 27, No. 8, pp. 1256-1266, Aug. 2019, doi: 10.1109/TASLP.2019.2915167.
Vassil Panayotov et al., "Librispeech: an ASR corpus based on public domain audio books", 2015 IEEE International Conference on Acoustics, Speech and Signal Processing (ICASSP), South Brisbane, QLD, Australia, 2015, pp. 5206-5210, doi: 10.1109/ICASSP.2015.7178964.
Ethan Perez et al., "FiLM: Visual Reasoning with a General Conditioning Layer", Proceedings of the Thirty-Second AAAI Conference on Artificial Intelligence (AAAI-18), Article 483, pp. 3942-3951, 2018.
David Snyder et al., "X-vectors: Robust DNN Embeddings for Speaker Recognition", 2018 IEEE International Conference on Acoustics, Speech and Signal Processing (ICASSP), Calgary, AB, Canada, 2018, pp. 5329-5333, doi: 10.1109/ICASSP.2018.8461375.
Jean-Marc Valin et al., "A Perceptually-Motivated Approach for Low-Complexity, Real-Time Enhancement of Fullband Speech", arXiv:2008.04259v2 [eess.AS], Aug. 27, 2020, 5 pages.
Aaron van den Oord et al., "Parallel WaveNet: Fast High-Fidelity Speech Synthesis", Proceedings of the 35th International Conference on Machine Learning, 2018.
Kai Wang et al., "TSTNN: Two-Stage Transformer Based Neural Network for Speech Enhancement in the Time Domain", ICASSP 2021—2021 IEEE International Conference on Acoustics, Speech and Signal Processing (ICASSP), 2021, pp. 7098-7102.
Quan Wang et al., "VoiceFilter-Lite: Streaming Targeted Voice Separation for On-Device Speech Recognition", ArXiv abs/2009. 04323, 2020, pp. 2677-2681.

(56) References Cited

OTHER PUBLICATIONS

Quan Wang et al., "VoiceFilter: Targeted Voice Separation by Speaker-Conditioned Spectrogram Masking", Interspeech, 2018, pp. 2728-2732.
Scott Wisdom et al., "Unsupervised Sound Separation Using Mixture Invariant Training", arXiv: Audio and Speech Processing, 2020, 12 pages.
Ruilin Xu et al., "Listening to Sounds of Silence for Speech Denoising", ArXiv abs/2010.12013, 2020, 16 pages.
Extended European Search Report issued on Feb. 27, 2023 by the European Patent Office for EP Patent Application No. 22179714.5.
International Search Report (PCT/ISA/210) and Written Opinion (PCT/ISA/237) issued by the International Searching Authority on Apr. 24, 2023 in corresponding International Application No. PCT/KR2023/000693.
Sherif Abdulatif et al., "Investigating Cross-Domain Losses for Speech Enhancement", arXiv:2010.10468v1 [cs.SD], Oct. 20, 2020, 5 pages.
Communication issued on May 23, 2024 by the European Patent Office for European Patent Application No. 22179714.5.

* cited by examiner

FIG. 6B

Structured sparsity (Training)

$[x]_1 \times g_{\theta,s}([z]_1) = [y]_1$ $[x]_2 \times g_{\theta,s}([z]_2) = [y]_2$ $[x]_3 \times g_{\theta,s}([z]_3) = [y]_3$ $[x]_b \times g_{\theta,s}([z]_b) = [y]_b$ (Testing)

$x \times g_{\theta,s}(z*) = y$

METHOD AND SYSTEM FOR PERSONALISING MACHINE LEARNING MODELS

CROSS-REFERENCE TO RELATED APPLICATION(S)

This application is a continuation of PCT/KR2023/000693, filed on Jan. 13, 2023, at the Korean Intellectual Property Receiving Office and claims priority under 35 U. S. C. § 119 to Europe Patent Application No. 22179714.5, filed on Jun. 17, 2022, in the Europe Intellectual Property Office, the disclosure of which is incorporated by reference herein in its entirety.

BACKGROUND

1. Field

The present application generally relates to personalized machine learning, ML, models. In particular, the present application provides a method for personalising machine learning models, such as those used for speech recognition, without increasing latency or the processing power required at inference (run) time.

2. Description of Related Art

Speech recognition systems are ubiquitous, and most often used on personal devices, such as mobile phones or voice assistant devices. Currently, machine learning models are the state-of-the-art in speech recognition. Machine learning relies on using training data to train a machine learning model, such as a deep neural network to perform a specific task. Solving complex task may then require large amounts of data and possibly large neural networks that require a lot of computational resources, both for training and at inference time.

Conditional neural networks play an important role in a number of sequence-to-sequence modelling tasks, such as personalized sound enhancement (PSE), speaker dependent automatic speech recognition (ASR), and generative modelling such as text-to-speech synthesis. The use of conditional neural networks is also common in other areas, e.g., in computer vision.

In conditional neural networks, the output of a model is often influenced by a conditioning vector, in addition to the input into the model. Common approaches for conditioning neural networks include input concatenation or modulation with the conditioning vector, which comes at a cost of increased model size. For example, these techniques may significantly increase the network parameters by inflating the dimensionality of input features before they are passed through a neural network layer, or by requiring additional network parameters proportional to the dimensionality of the conditioning vectors multiplied by the number of channels in the representations. The concatenation of a conditioning vector increases the weight matrix size, thereby increasing dramatically the model size, dynamic memory as well as the overall latency.

As such, previous approaches to conditioning have worked only in limited scenarios, often powered by powerful servers working off-line (e.g. for demonstration purposes), making such approaches inappropriate for on-device deployment.

The applicant has therefore identified the need for a method to reduce the model size and improve the efficiency of conditional neural networks so that they can be used on resource-constrained devices.

SUMMARY

In a first approach of the present techniques, there is provided a computer-implemented method for training, on a server, a machine learning, ML, model having a first neural network and a second neural network, the method comprising: obtaining a training dataset comprising a plurality of pairs of data items to be processed by the ML model, each pair of data items comprising a conditioning vector that represents an individual user and an input data item; and training the ML model by jointly: training the first neural network of the ML model to transform weights of at least one layer of the second neural network into personalized weights for individual users using the conditioning vector of the pairs of data items; and training the second neural network of the ML model to process the input data item of the pairs of data items using the personalized weights for the at least one layer, and to generate output data.

Advantageously, the present techniques provide a general approach for neural network conditioning, which not only improves the performance of personalized neural networks, but also results in a reduced size trained model, lower dynamic memory requirements and reduced latency. This makes the trained model of the present techniques particularly suitable for use on constrained-resource devices, such as smartphones, IoT devices, and so on. When the trained model is used on non-constrained devices, the model budget gains can be traded-off for further improvements in the output of the model.

The present techniques achieve these advantages by not relying on concatenating intermediate representations of the network with the conditioning vector. Instead the ML model learns weights based on the conditioning vector. As noted above, the ML model comprises a first neural network and a second neural network. The second neural network performs the key function(s) of the ML model. For example, the second neural network may process speech inputs and output enhanced speech. The first neural network learns how to transform a conditioning vector into personalized weights for at least one layer of the second neural network. By altering the weights, there is no need for the conditioning vector to be concatenated to each input that needs to be processed by the second neural network.

Training the ML model may comprise training the first neural network to generate personalized weights that cause the second neural network to generate output data that best matches a ground truth. That is, the training continues until the first neural network generates weights that enable the second neural network to process input data and generate output data that is of a satisfactory quality or accuracy. This quality or accuracy may be user-defined or pre-defined.

As the first and second neural networks are trained jointly, the weights of the first neural network and second neural network may be randomly initialized at the start of the training process. Thereafter, the weights of both neural networks will be determined during the training process.

Training the first neural network may comprise training the first neural network to learn a function that transforms the weights to personalized weights. As explained in more detail below, the personalized weights may vary depending on the input data and/or the conditioning vector. Thus, the first neural network may learn a function that transforms a conditioning vector into personalized weights.

As noted below in more detail, the present techniques are not restricted to weights. The first neural network may also learn a function that transforms trainable biases into personalized biases. Thus it will be understood that where reference is made to personalized weights herein, biases may also be personalized.

In addition to personalising the weights (and biases) of at least one layer of the second neural network based on conditioning vectors, the present techniques may further personalise the weights (and biases) based on hardware and/or performance constraints. For example, the trained ML model may be used on a wide variety of user devices, such as smartphones, virtual assistant devices, IoT devices and so on. Even smartphones vary in their hardware? high end or top tier smartphones may have processors and memories capable of using large ML models, whereas mid-tier smartphones may not be able to use the same ML models without impacting performance of the smartphone or without latency issues. Thus, the present techniques train the ML model using different hardware constraints (such as memory size, processing power, etc.) and/or performance constraints (such as latency or accuracy). The method may further comprise receiving at least one constraint. Then training the ML model may further comprise using the received at least one constraint to train the first and second neural networks to generate output data.

The at least one constraint may be any one or more of: a hardware constraint, a computational capability, an inference latency, and an inference energy consumption.

As explained in more detail below, there may be different ways to generate a trained ML model that can be implemented on different devices. One way is to introduce sparsity in the personalized weights. That is, the personalized weights, which may be represented as a matrix of numbers, may be made suitable for different devices by altering some values to be zero or close to zero. Zero values do not need to be used in computations, so increasing the number of zero values may enable the complexity of the ML model (i.e. of the second neural network) to be reduced, which may make it more suitable for implementation on resource-constrained devices. The training is performed to determine how to introduce sparsity into the personalized weights without impacting the accuracy of the trained ML model. Thus, using the received at least one constraint to train the ML model to generate output data may comprise restricting values of the personalized weights to be within a predefined range. For example, the personalized weights may be restricted to be any value between, and including, 0 and 1.

The sparsity may be unstructured, such that the sparsity is introduced in random locations within the personalized weights matrix. Alternatively, the sparsity may be structured, such that the sparsity is in blocks (vertical and/or horizontal) in the matrix.

The ML model may be for sound enhancement and/or automatic speech recognition. That is, the ML model may be used to improve the quality of audio comprising speech, which may enable a speaker to be more clearly heard and understand, and for downstream tasks such as automatic speech recognition to be performed more accurately. In this case, the input data item of each pair of data items may comprise at least one audio noise sample and at least one clean audio sample that each contain speech of individual speakers; and the conditioning vector may be a speaker embedding vector for each individual speaker. Training the ML model may then comprise training the second neural network to remove the noise from the corrupted audio samples while maintaining the speech of the individual speakers. Any suitable technique may be used to train the second neural network to remove the noise.

In some cases, it may be necessary to generate the conditioning vector itself. This may be achieved, for example, by passing a reference data item through an embedding network, wherein the reference data item is an audio data item comprising speech of a specific speaker, and wherein passing the reference data item through an embedding network comprises learning sound characteristics of the specific speaker. Thus, the method may further comprise generating the speaker embedding vector for each individual speaker by: obtaining at least one clean audio signal for an individual speaker; and applying a speaker recognition model to the at least one clean audio signal to generate a speaker embedding vector representing a speech profile of the individual speaker. Any suitable speaker recognition model may be used to generate a speaker embedding vector for each individual speaker using the clean audio samples for that speaker.

The ML model may be for text-to-speech conversion. In this case, the input data item of the pairs of data items may comprise at least one text sample and a corresponding audio sample; and the conditioning vector may be an embedding vector representing a target voice for the speech. The conditioning vector may be used to modify the gender or pitch of the output speech, for example.

In a second approach of the present techniques, there is provided a server for training a machine learning, ML, model having a first neural network and a second neural network, the server comprising: at least one processor coupled to memory and arranged to: obtain a training dataset comprising a plurality of pairs of data items to be processed by the ML model, each pair of data items comprising a conditioning vector that represents an individual user and an input data item; and train the ML model by jointly: training the first neural network of the ML model to transform weights of at least one layer of the second neural network into personalized weights for individual users using the conditioning vector of the pairs of data items; and training the second neural network of the ML model to process the input data item of the pairs of data items using the personalized weights for the at least one layer, and to generate output data.

The features described above with respect to the first approach apply equally to the second approach and therefore, for the sake of conciseness, are not repeated.

In a third approach of the present techniques, there is provided a computer-implemented method for using, on a user device, a trained machine learning, ML, model having a first neural network and a second neural network, the method comprising: obtaining an input data item; and processing the input data item using the second neural network, the second neural network comprising at least one layer having personalized weights that are personalized for a target user of the user device, and thereby generating output data.

The method may further comprise: obtaining a conditioning vector for the target user of the user device; using the first neural network to calculate the personalized weights of at least one layer of the second neural network using the conditioning vector; and setting weights of at least one layer of the second neural network to the personalized weights.

The trained ML model may be for sound enhancement and/or automatic speech recognition. Thus, the conditioning vector for the target user may be a speaker embedding vector for the target user. The method may further comprise generating the speaker embedding vector for the target user by: obtaining at least one clean audio signal of the target user; and applying a speaker recognition model to the at least one clean audio signal of the target user to generate the speaker embedding vector representing a speech profile of the target user. The target user may take part in an enrolment process to provide a sample of their voice (i.e. the clean audio signal containing just the user's voice). This enrolment process only needs to be performed once per user.

In a fourth approach of the present techniques, there is provided an apparatus for using a trained machine learning, ML, model having a first neural network and a second neural network, the apparatus comprising: at least one processor coupled to memory and arranged to: obtain an input data item; and process the input data item using the second neural network, the second neural network comprising at least one layer having personalized weights that are personalized for a target user of the user device, and thereby generating output data.

The features described above with respect to the third approach apply equally to the fourth approach and therefore, for the sake of conciseness, are not repeated.

The apparatus may be a constrained-resource device, but which has the minimum hardware capabilities to use a trained neural network. The apparatus may be any one of: a smartphone, tablet, laptop, computer or computing device, virtual assistant device, a vehicle, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

Thus, the present techniques provide a way to dynamically assign optimal weights and biases to generate a personalized model for a user, yielding increased system performance. The increased system performance may be in terms of quality (e.g. accuracy) and/or faster run time and/or a better energy profile.

The present techniques provide a personalized ML model that does not require additional parameters to be used at inference time.

The personalisation may be in terms of user characteristics (e.g. voice profile) to increase the quality of the output of the trained ML model, and additionally may be in terms of the hardware capabilities of the user device on which the trained ML model is to be used. Thus, for different users, different models will be generated so that higher quality can be attained for each user, and for the same user, smaller or larger models can be generated to target devices with various hardware capabilities belonging to the user, which increases quality within the compute ecosystem of each user.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIG. 6B shows how structured sparsity may be used to further customise the personalized weights of the present techniques;

DETAILED DESCRIPTION

Broadly speaking, embodiments of the present techniques provide a method and system for personalising machine learning models on resource-constrained devices by using conditional neural networks. In particular, the present techniques allow for resource-efficient use of a conditioning vector by incorporating the conditioning vector into weights learned during training. This reduces the computational resources required at inference time.

Figure 1:
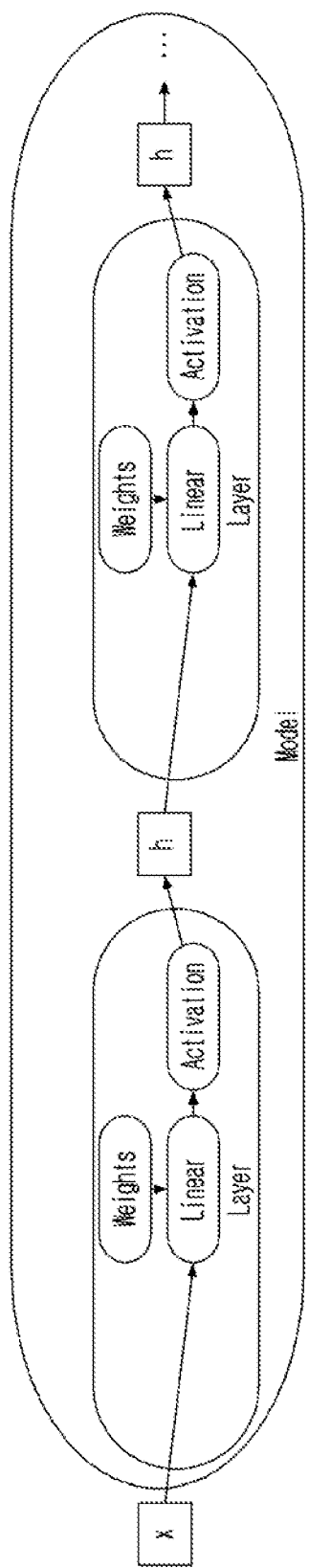
FIG. 1 shows a schematic diagram of a typical non-conditioned neural network.

FIG. 1 shows a schematic diagram of a typical non-conditioned neural network. Here, the neural network is a sequential model with multiple layers, where each layer has a linear part and an activation part.

Figure 2A:
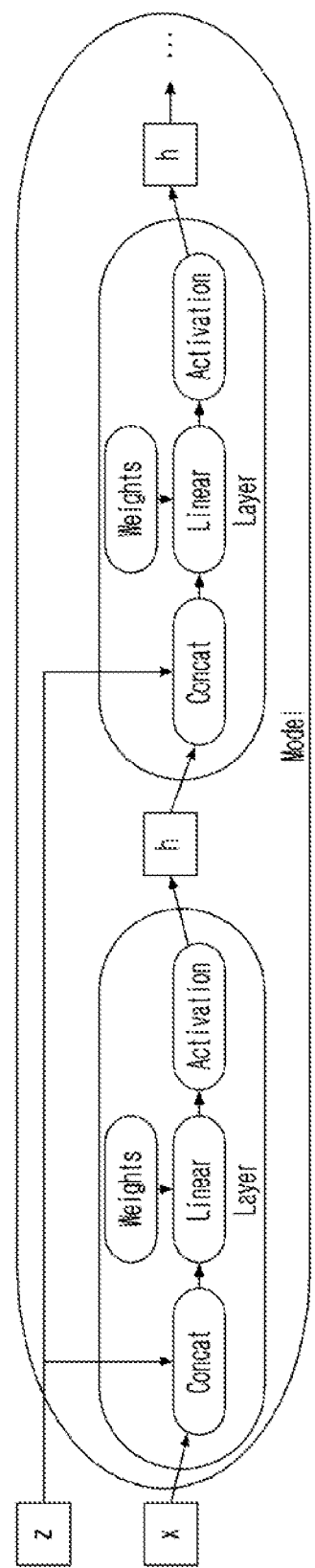
FIG. 2A shows a schematic diagram of a typical conditioned neural network.
Figure 2B:
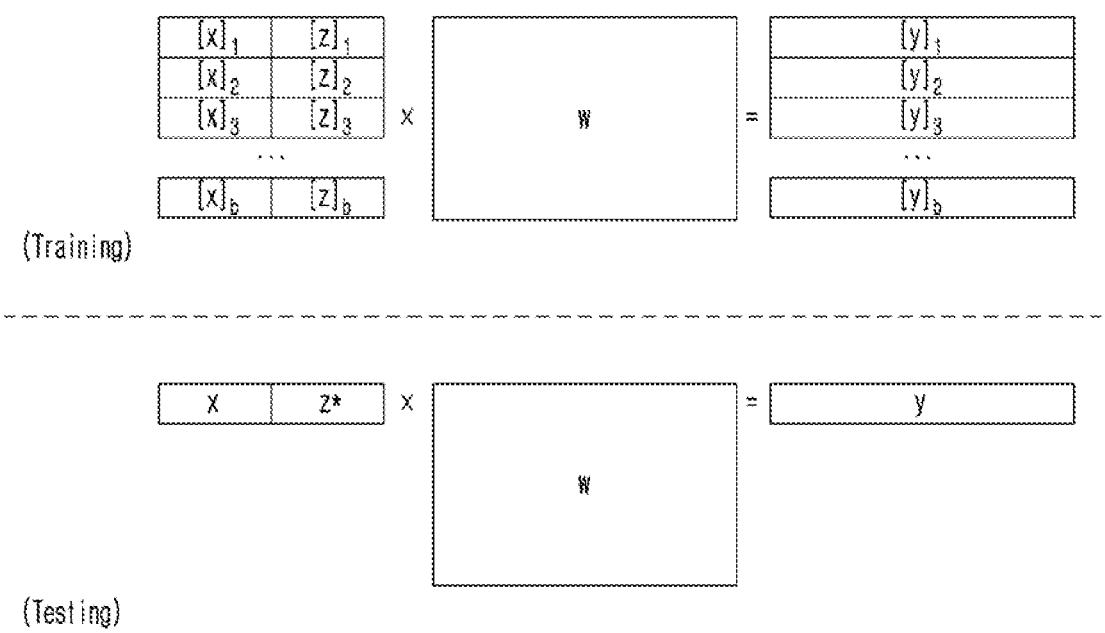
FIG. 2B shows a schematic diagram of the personalisation approach used during training and inference.

In comparison, FIG. 2A shows a schematic diagram of a typical conditioned neural network. Generally speaking, personalisation can be achieved via conditional neural networks, which aim to leverage additional information to improve models. The conditional neural networks accept a conditioning vector z that modifies how neural networks transform inputs x into outputs y. At training time, the neural networks may be provided with sampled pairs of data (z, x) as inputs, whereas at deployment/inference time, the conditioning vector z may be fixed in some cases, such that the only varying input into the neural networks is the input data x. However, as explained above, this sort of personalisation technique leads to larger weights and higher latency. This is because the concatenation requires an increased number of parameters $w \in R^{(d+f_{in}) \times f_{out}}$ and therefore increased computational resources. FIG. 2B shows a schematic diagram of the personalisation approach used during training of, and inference using, the conditioned neural network of FIG. 2A. As shown in FIG. 2B, a conditioning vector z, which may be a user's enrolment data, is concatenated with an input x before matrix multiplication is performed by a layer of the neural network which are to be conditioned. As shown, the same weights w of a layer of the neural network are used in the multiplication.

Such conditional neural networks are based on conditioning via concatenation, where for trainable weights $w \in R^{(d+f_{in}) \times f_{out}}$ and biases $b \in R^{1 \times f_{out}}$ the linear parts of dense layers are defined by $$[t]_{j,i} := \begin{cases} [z]_{j,i}, & \Leftarrow i \le d, \\ [x]_{j,i-d}, & \Leftarrow i > d, \end{cases}$$

$$y := t \times w + b.$$

In other words, the features of the inputs x are enlarged to also encompass the conditioning vector information z before being multiplied by the weights and offset by the biases.

Figure 3A:
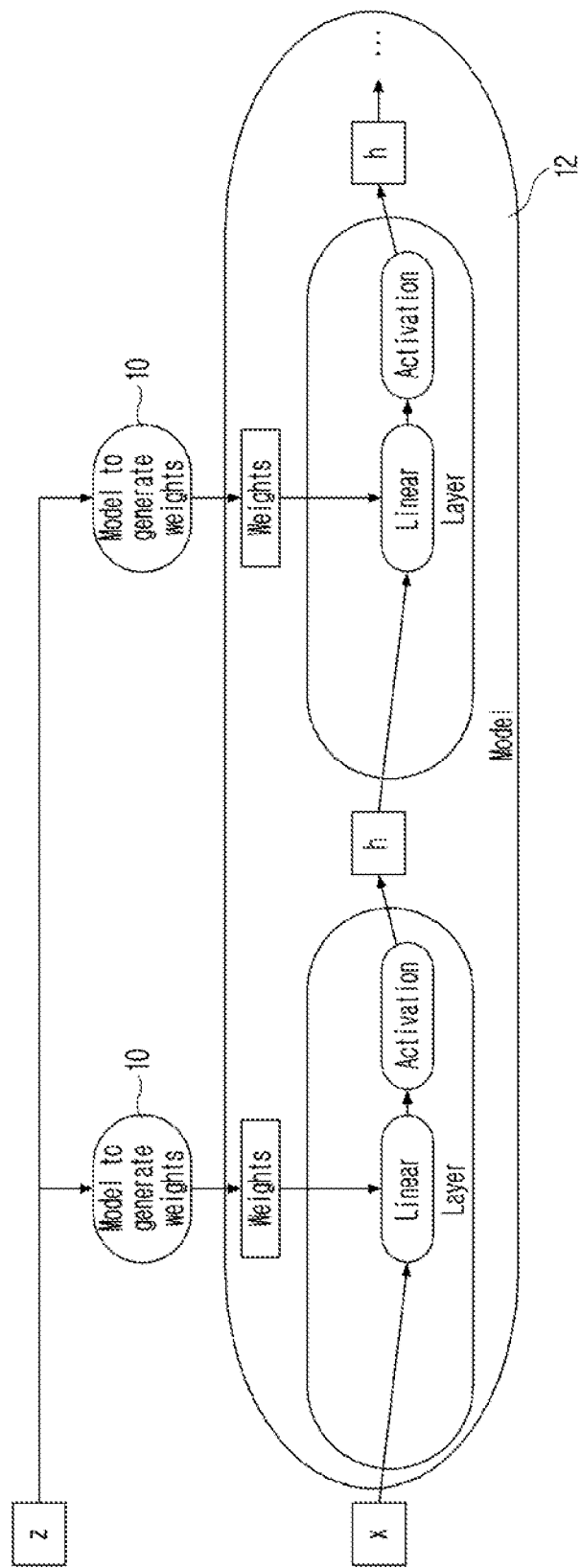
FIG. 3A shows a schematic diagram of a conditioned neural network of the present techniques.

FIG. 3A shows a schematic diagram of a conditioned neural network of the present techniques. It can be seen that instead of concatenating the conditioning vector z to every input x, the present techniques uses the conditioning vector z to determine the weights w of the layers of the neural network which are to be conditioned. This leads to a personalized neural network that has smaller weights and lower latency than the existing neural networks (such as that shown in FIG. 2A).

Figure 3B:
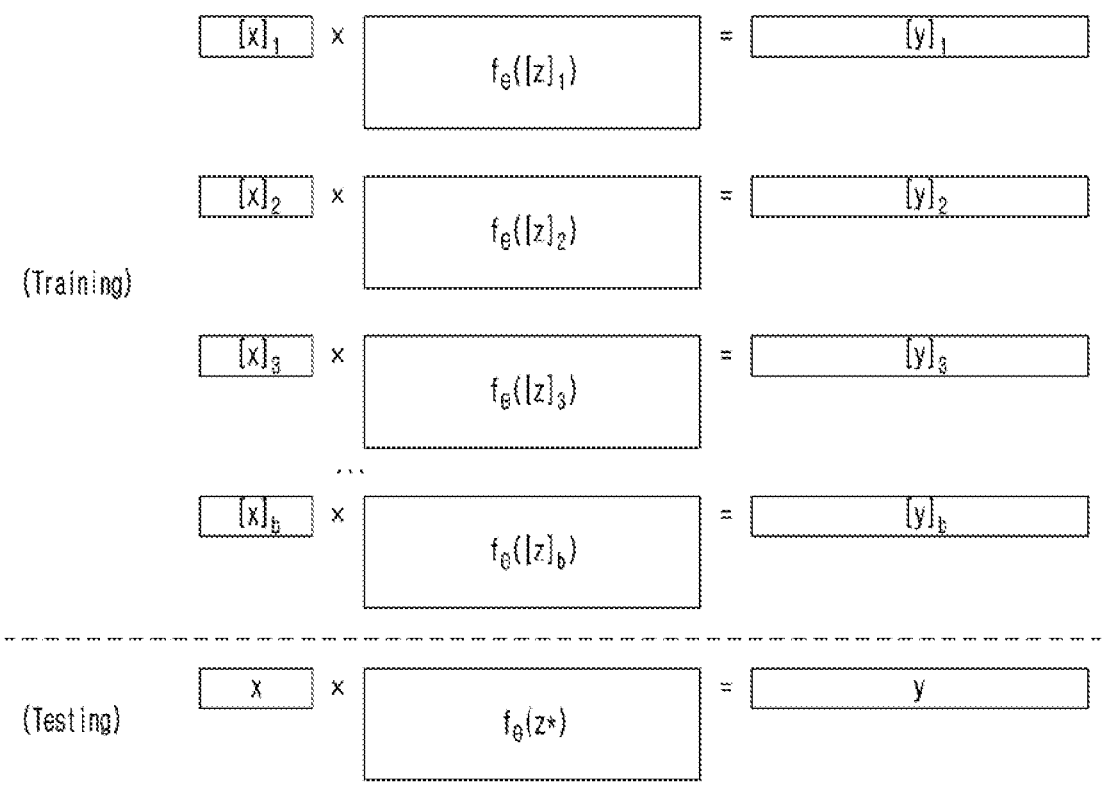
FIG. 3B shows a schematic diagram of the personalisation approach of the present techniques during training and inference.

FIG. 3B shows a schematic diagram of the personalisation approach of the present techniques during training and inference. Here, as shown, the weights of the layers of the neural network which are to be conditioned are altered using the conditioning vector z. This results in a different dynamic weight $f_\theta(z)$ for each conditioning vector. The result is better models, given that the dynamic assignment can be as complex as possible without extra processing cost at inference time. Furthermore, smaller models are possible given there is no inflation of the number of parameters as a consequence of the personalisation mechanism (c.f. FIG. 2B).

As shown in FIG. 3A, the machine learning, ML, model of the present techniques has a first neural network (or first model) 10 and a second neural network (or second model) 12. Training of the ML model involves obtaining a training dataset comprising a plurality of pairs of data items to be processed by the ML model, each pair of data items comprising a conditioning vector z that represents an individual user and an input data item x. Then, the two neural networks are trained jointly. That is, training the ML model comprises, jointly: training the first neural network 10 of the ML model to transform weights of at least one layer of the second neural network 12 into personalized weights for individual users using the conditioning vector z of the pairs of data items; and training the second neural network 12 of the ML model to process the input data item x of the pairs of data items using the personalized weights for the at least one layer, and to generate output data.

In other words, the conditioning vectors z are used to dynamically change the weights and biases used in the layers of a machine learning model to values that work best for each user. In particular, this approach does not require any expensive concatenation to include the conditioning information in the network. FIG. 3B shows this for the particular case of a Dense layer (although the approach is general and works with any layer). Here, the conditioned weights need fewer parameters: $f_\theta(z) \in R^{f_{in} \times f_{out}}$.

As explained below, the present techniques can be used for dense, convolutional and recurrent layers, which demonstrates the generality of the present techniques to any other type of layer. As will be shown later, computational savings increase with tensor dimension, so the savings are higher for, for example, temporal data.

At training time, it is necessary to create and learn trainable variables θ that better create weights and biases from conditioning vectors z. This artificially increases model size (because the first neural network 10 is needed), dynamic memory and latency. However, at inference time, inference time conditioning vector z* is computed only once from enrolment data used to generate the personalized weights. Thereafter, the first neural network 10 does not need to be used. To obtain z*, a standard neural network or other technique may be used that obtains a value of z* from enrolment data. Hence, it is possible to use a pre-computed $f_\theta(z^*)$, which removes the need to explicitly store and use θ, and results in much smaller models, lower dynamic memory and lower latency at inference time.

As indicated above, the present techniques result in improved model performance by dynamically assigning a set of different weights to each user. Given the compute ecosystem, i.e. the number of devices per user is increasing, it is worthwhile to be able to further customise the model for each user so that different versions of the model can run on a wider range of devices. This would mean that larger and more resource-intensive models could run on less resource-constrained devices at different quality and budget trade-offs.

Thus, in addition to personalising the weights (and biases) of at least one layer of the second neural network based on conditioning vectors, the present techniques may further personalise the weights (and biases) based on hardware and/or performance constraints. For example, the trained ML model may be used on a wide variety of user devices, such as smartphones, virtual assistant devices, IoT devices and so on. Even smartphones vary in their hardware—high end or top tier smartphones may have processors and memories capable of using large ML models, whereas mid-tier smartphones may not be able to use the same ML models without impacting performance of the smartphone or without latency issues. Thus, the present techniques train the ML model using different hardware constraints (such as memory size, processing power, etc.) and/or performance constraints (such as latency or accuracy). The method may further comprise receiving at least one constraint. Then training the ML model may further comprise using the received at least one constraint to train the first and second neural networks to generate output data.

The at least one constraint may be any one or more of: a hardware constraint, a computational capability, an inference latency, and an inference energy consumption.

This user-hardware aware personalisation can be achieved by augmenting the proposed user aware personalisation approach with sparsity inducing training methods. As explained in more detail below, there may be different ways to generate a trained ML model that can be implemented on different devices. One way is to introduce sparsity in the personalized weights. That is, the personalized weights, which may be represented as a matrix of numbers, may be made suitable for different devices by altering some values to be zero or close to zero. Zero values do not need to be used in computations, so increasing the number of zero values may enable the complexity of the ML model (i.e. of the second neural network) to be reduced, which may make it more suitable for implementation on resource-constrained devices. The training is performed to determine how to introduce sparsity into the personalized weights without impacting the accuracy of the trained ML model. Thus, using the received at least one constraint to train the ML model to generate output data may comprise restricting values of the personalized weights to be within a predefined range. For example, the personalized weights may be restricted to be any value between, and including, 0 and 1.

The sparsity inducing training methods can be used to collapse or expand values (FIG. 6A) or rows/columns (FIG. 6B), thereby producing smaller (if sparsity is seen inside the existing weights) or larger models (if sparsity is seen outside the existing weights). The sparsity may be unstructured, such that the sparsity is introduced in random locations within the personalized weights matrix. Alternatively, the sparsity may be structured, such that the sparsity is in blocks (vertical and/or horizontal) in the matrix. This is explained in more detail below.

Note, that while the distinction between training and inference time is crucial at particular points herein, whenever possible both cases are treated simultaneously by having b denote the batch size (greater than one during training and equal to one during inference), and batching the d-dimensional conditioning vectors, i.e. $z \in R^{b \times d}$.

The present techniques focus on personalising weights, given that biases can be incorporated into weights via the 'vector of ones' standard trick. The personalized weights are then applied to any layers where conditioning is to be performed. Generally, the effect of conditioning is greatest when applied at the first (early) layers of a neural network, as this is where high-level features are generally extracted.

Without compromising quality metrics, the model size is effectively decreased by pre-computing the optimal weights and biases once and discarding the predictor network i.e. the first neural network described above. With an approach optimised for deployment, dynamic memory and latency at inference time are optimised to allow the technology to reach smaller and more constrained devices at the expense of training (which is done offline without impact to the device user). Moreover, although personalisation typically refers to the use of user information, e.g. an embedding vector computed from audio enrolment data for quality improvement, the proposed solution enables personalisation also in terms of the power of the device (by taking as the conditioning vector, not just the embedding vector, but also a sparsity inducing parameter).

Notation: Given that the methods of the present techniques are applicable to any network layer, in particular to any tensor dimension, it is useful to introduce a bit of notation to make the presentation more compact. In particular, italic lower case letters denote scalars and boldface lower case letters denote tensors, e.g. c and c, respectively. Given a tensor with n dimensions, say $c \in R^{d_1 \times \cdots \times d_n}$, denote by $[c]i_1, \ldots, i_n$ one of its entries, whereas for example denote by $[c]i_1$ the n−1 dimensional tensor extracted from the first axis. As an example, for a matrix $m \in R^{d_1 \times d_2}$, denote by $[m]i,j$, $[m]i$ and $[m]:j$, its (i,j) element, its i-th row, and its j-th column respectively.

Figure 4:
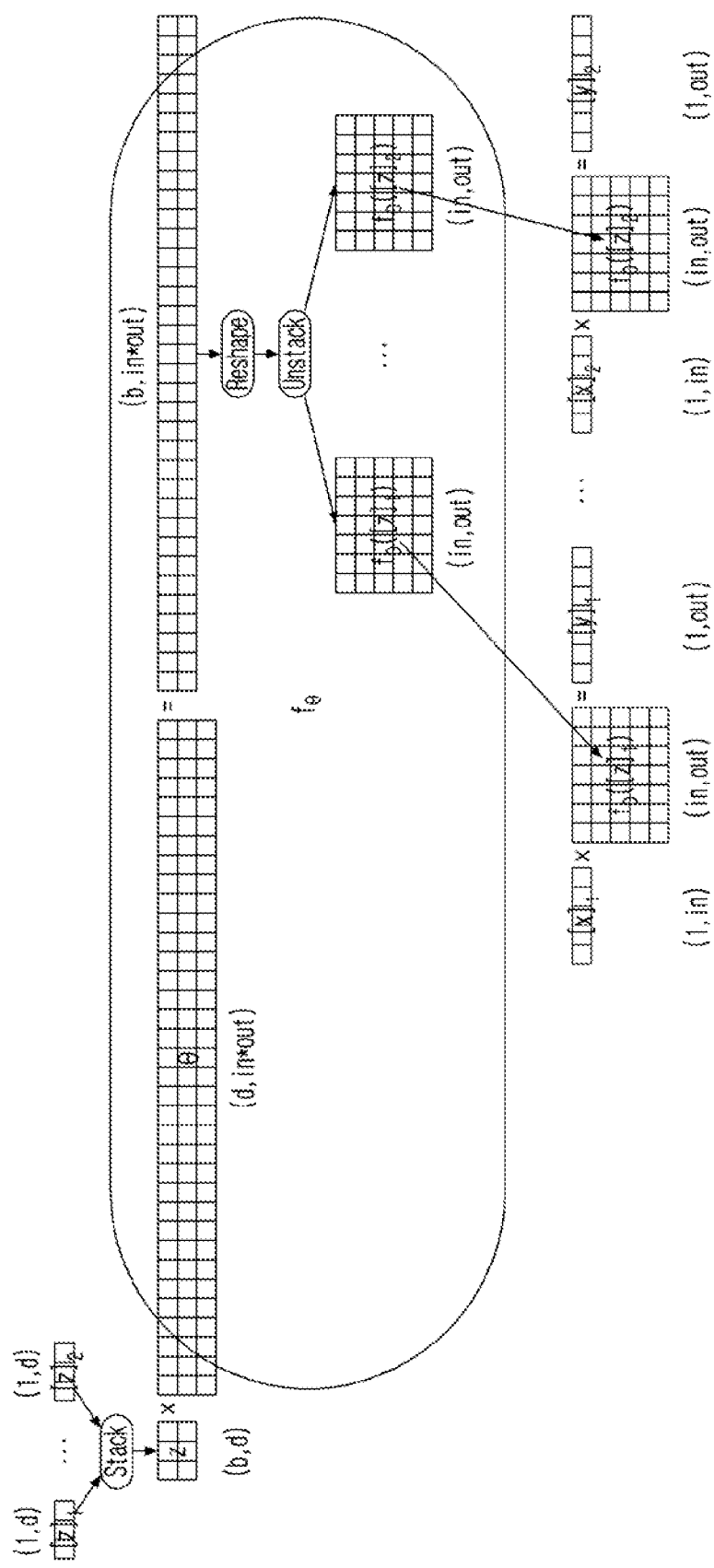
FIG. 4 is a schematic diagram showing one way to generate the personalized weights of the present techniques.
Figure 5:
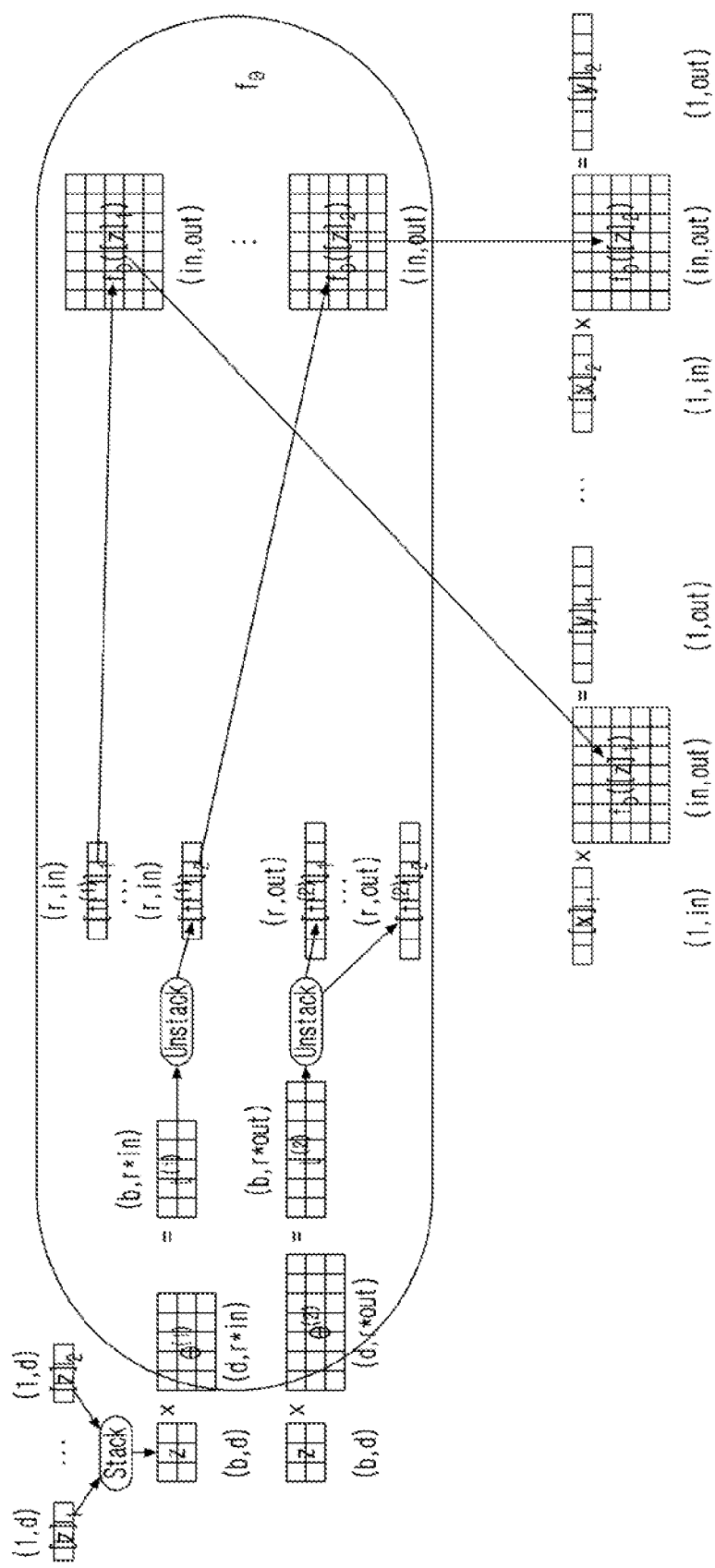
FIG. 5 is a schematic diagram showing another way to generate the personalized weights of the present techniques.

FIGS. 4 and 5 illustrate possible ways to generate the personalized weights of the present techniques. In particular, FIGS. 4 and 5 provide a visualisation of how the dynamic weight $f_\theta(z)$ is constructed. In both FIGS. 4 and 5, inputs x, conditioning vectors z and outputs y are considered. Note further that, for simplicity, $f_\theta(z)$ is depicted in these figures as a dense layer but the approach is general and can be applied to an arbitrarily deep neural network.

The implementation shown in FIG. 4 provides an overview of the techniques used but requires more parameters than is necessary. The size of the learnable parameters θ of the approach shown in FIG. 4 is $d*f_{in}*f_{out}$, which may not be suitable for low power embedded devices given the number of parameters scales with the product of the inputs and outputs size. The construction of $f_\theta(z)$ requires learnable parameters θ of shape $[d, f_{in}*f_{out}]$. The diagram is depicted to scale, e.g. with batch size b=2, size of conditioning vectors d=3, inputs size $f_{in}$=5 and outputs size $f_{out}$=7.

The implementation shown in FIG. 5 relies on CP decomposition and hence, the size of the learnable parameters θ (specifically of $\theta^{(1)}$ and $\theta^{(2)}$ in this approach is $d*r*(f_{in}+f_{out})$. This is suitable for low power embedded devices with small amounts of memory and processing power given that the inputs and outputs size affect the complexity in an addition rather than multiplication fashion. The construction of $f_\theta(z)$ requires learnable parameters $\theta^{(1)}$ and $\theta^{(2)}$ of shapes $[d, r*f_{in}]$ and $[d, r*f_{out}]$ respectively. The diagram is depicted to scale, e.g., with batch size b=2, size of conditioning vectors d=3, inputs size $f_{in}$=5, outputs size $f_{out}$=7 and rank size r=1. The implementation shown in FIG. 5 is therefore a more efficient implementation compared to that shown in FIG. 4.

Implementation details: The present techniques involve dynamically selecting different weights $[f_\theta(z)]_j$ for each conditioning vector $[z]_j$ via a learned transformation $f_\theta: R^d \to R^{f_{in} \times f_{out}}$, namely $$[y]_j = [x]_j \times [f_\theta(z)]_j + b.$$

This idea can be realised with different transformations $f_\theta$, selected based on trade-offs to improve quality metrics and training time requirements. A particularly important case is a strategy inspired by Candecomp/Parafac (CP) decomposition (Tamara G. Kolda and Brett W. Bader. Tensor Decompositions and Applications. SIAM Review, 51(3):455?500, 2009), which decomposes a tensor as a sum of rank-one tensors. For a hyper-parameter r denoting rank and trainable variables $\theta^{(1)} \in R^{d \times (rf_{in})}$ and $\theta^{(2)} \in R^{d \times (rf_{out})}$ define $f_\theta$ by the sum of component rank one tensors $$t^{(1)} := \text{reshape}(z \times \theta^{(1)}, [b, r, f_{in}]),$$

$$t^{(2)} := \text{reshape}(z \times \theta^{(2)}, [b, r, f_{out}]),$$

$$[f_\theta(z)]_{j,i_1,i_2} := \sum_{l=1}^{r} [t^{(1)}]_{j,l,i_1} \cdot [t^{(2)}]_{j,l,i_2}.$$

In the aforementioned CP decomposition realisation, the cost of the present techniques at training time in terms of model size is $dr(f_{in}+f_{out})$ compared with conventional approaches that requires $(d+f_{in})f_{out}$. This can be either more costly or cheaper. For cases where f≈1 and f>>d, the present techniques (O(f)) result in considerable savings compared with conventional approaches (O(f²)). However, for cases where r>>1 and f≈d that might not be the case at training time.

At inference time however, the proposed techniques always yield better run-time performance than conventional approaches, since at inference time, for each user j, $[f_\theta(z)]_j$ is pre-computed at enrolment time, and this is a smaller matrix than w that also operates on a smaller input x than t.

Application to Conv1D layers: Given that the approach of the present techniques impacts the weights and biases of the network, it can therefore be described by how it impacts the linear parts of each layer. As the name indicates, for convolutional layers the main linear operation is that of convolution. In this subsection the focus is on 1-d convolutions, e.g., temporal convolutions, which transform input $x \in R^{b \times s \times f_{in}}$ into output $y \in R^{b \times s \times f_{out}}$ tensors.

Conventional conditional neural networks for temporal data are based on concatenating the conditioning vector with each time frame of the input, i.e, for window size k and trainable weights $w \in R^{k \times (f_{in}+d) \times f_{out}}$ and biases $b \in R^{1 \times 1 \times f_{out}}$, $$[t]_{j,i} := \begin{cases} [z]_{j,i}, & \Leftarrow i \leq d, \\ [x]_{j,i-d}, & \Leftarrow i > d, \end{cases}$$

$$y := t \times w + b.$$

In contrast, the present techniques apply to convolutional layers in the same way as they apply to dense layers. It consists of dynamically learning different weights $[f_\theta(z)]_j$ for each conditioning vector $[z]_j$ through a trainable mapping $f_\theta: R^d \to R^{f_{in} \times f_{out}}$, namely $$[y]_j = [x]_j * [f_\theta(z)]_j + b.$$

It can be useful to also show how the CP decomposition of the claimed invention manifests for convolutional layers, although other options are possible for trade-offs between quality metrics and training time requirements. Namely, for a hyper-parameter r denoting rank and trainable variables $\theta^{(3)} \in R^{d \times (r \cdot k)}$, $\theta^{(1)} \in R^{d \times (r \cdot f_{in})}$, and $\theta^{(2)} \in R^{d \times (r \cdot f_{out})}$ define $f_\theta$ by the sum of component rank one tensors $$t^{(3)} := \text{reshape}(z \times \theta^{(3)}, [b, r, k]),$$

$$t^{(1)} := \text{reshape}(z \times \theta^{(1)}, [b, r, f_{in}]),$$

$$t^{(2)} := \text{reshape}(z \times \theta^{(2)}, [b, r, f_{out}]),$$

$$[f_\theta(z)]_{j,i_3,i_1,i_2} := \Sigma_{l=1}^r [t^{(3)}]_{j,l,i_3} \cdot [t^{(1)}]_{j,l,i_1} \cdot [t^{(2)}]_{j,l,i_2}.$$

At training time, the present techniques require $dr(k+f_{in}+f_{out})$ whereas the conventional approach of concatenation requires $k(d+f_{in})f_{out}$. The savings for convolutions are even greater than for dense layers, given the window size k appears as a adding versus multiplying factor respectively. As with dense layers, a cost analysis of training time requirements may yield higher or lower cost depending on the size of the tensors and hyper-parameters.

At inference time however, the present techniques always yields better run-time performance, for the same reasons described when analysing Dense layers. The savings are even more pronounced than those described in Dense layers, given that for Conv1D layers the conventional approach of concatenation requires a concatenation at each time step of the input, whereas the approach of the present techniques via conditioned weights does not.

The approach of the present application is not limited to the above described examples but can be applied to any network comprising convolutional or dense layers. Generalisation to higher dimensional convolutional layers trivially follows from the above examples. Given that the internal components of recurrent neural networks (RNNs), such as LSTM or GRU layers are based on dense layers, the above mentioned methods for dense layers will apply. Since these layers usually comprise four (LSTM) or three (GRU) dense layers, the savings described earlier in the text will apply with a factor of 4 or 3 respectively.

Sparsity: Thus far, personalising weights of models for specific users has been described. However, in addition to personalising the weights (and biases) of at least one layer of the second neural network based on conditioning vectors, the present techniques may further personalise the weights (and biases) based on hardware and/or performance constraint. This user?hardware personalisation is now described. That is, for each user, different models are generated based on varying hardware profiles.

Figure 6A:
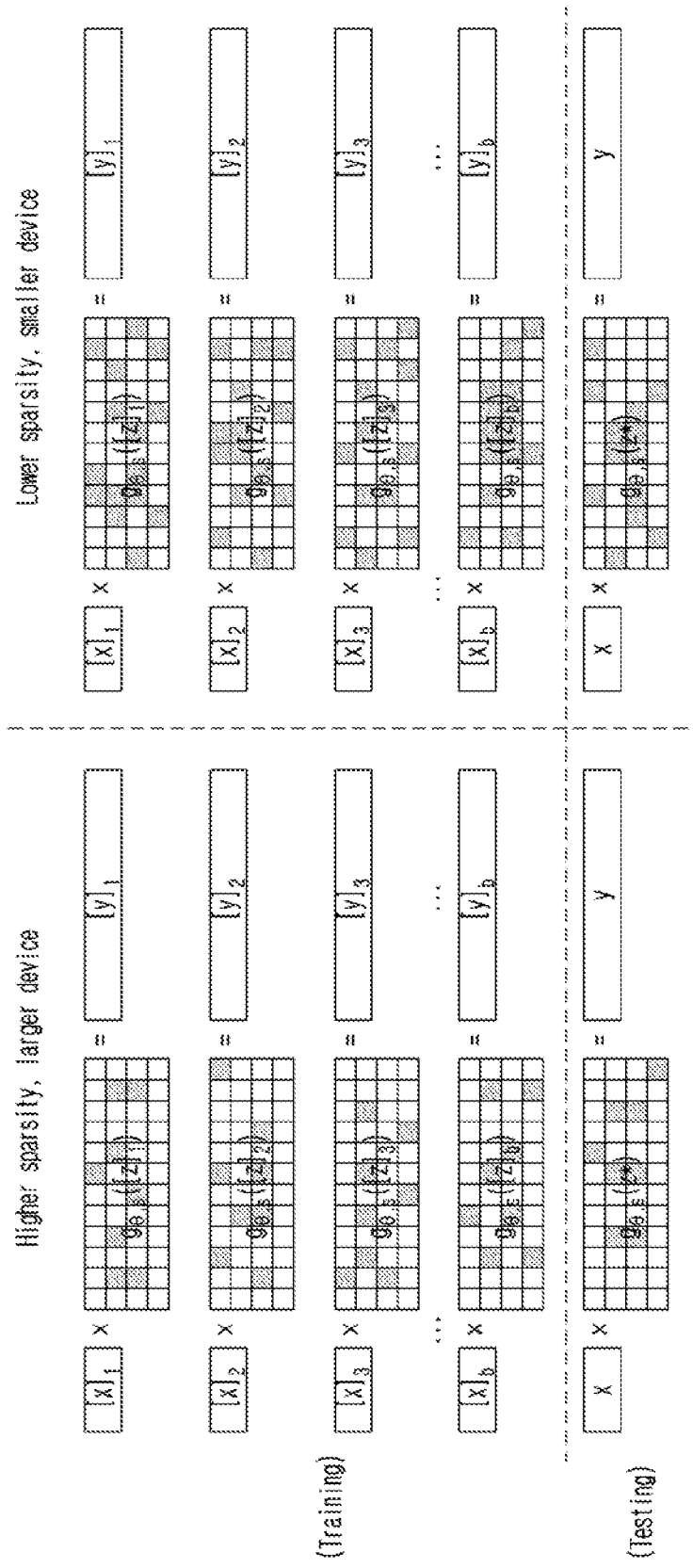
FIG. 6A shows how unstructured sparsity may be used to further customise the personalized weights of the present techniques.

FIG. 6A shows how unstructured sparsity may be used to further customise the personalized weights of the present techniques. In order to achieve this hardware personalisation, consider a sparsity parameter $s \in (0,1)$, two differentiable increasing functions $h_1: R \to (0,1)$ and $h_2: R \to (0,1)$, and define the dynamically personalized weights by:

$$[g_{\theta,s}(z)]_i := (-1)^i (h_1([f_\theta(z)]_i))^{h_2(s)}.$$

Informally, this ensures different signs of consecutive weights, restricts the weights to be in $(0,1)$ which doesn't impact negatively training nor inference, and ensures that for increasing s the values $(h_1([f_\theta(z)]_i))^{h_2(s)}$ closer to zero get much smaller than those closer to one, thereby effectively encouraging sparsity.

This can be encouraged further with regularisation, namely:

$$\|g_{\theta,s}(z)\|_1.$$

Thus, at least one constraint may be used to train the ML model to generate output data, by restricting values of the personalized weights to be within a predefined range. For example, the personalized weights may be restricted to be any value between, and including, 0 and 1.

FIG. 6B shows how structured sparsity may be used to further customise the personalized weights of the present techniques. The approach of FIG. 6A can be further configured to allow for structured rather than unstructured sparsity by considering differentiable functions $h_i: R \to R^+, i \geq 2$, and using instead the regularisation $$\Sigma_i h_{2+(i \bmod l)}(s)[g_{\theta,s}(z)]_i,$$

which depending on the target platform may yield better performance.

Given that by design sparsity increases with sparsity parameter s, for each new (user, device) pair, one can select s by constructing several weights $g_{\theta,s_j}(z)$ in sequence for $0 < s_1 < \ldots < s_n < 1$, and stopping the process based on either: 1) model size, or 2) running inference on each candidate model, and stopping the process when latency/energy exceeds a device specific threshold. This procedure needs to be done only once per (user, device) pair, and therefore has no run-time cost.

Figure 7:
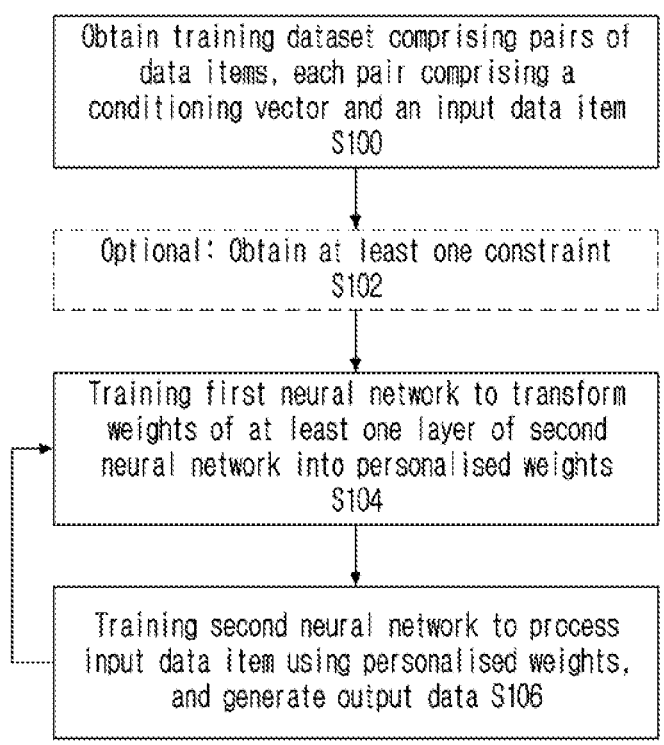
FIG. 7 is a flowchart of example steps to train the ML model according to the present techniques.

FIG. 7 is a flowchart of example steps to train the ML model according to the present techniques. The process shown in the flowchart may be performed on a server. The machine learning, ML, model has a first neural network and a second neural network, as explained above with reference to FIG. 3A. The process comprises: obtaining a training dataset comprising a plurality of pairs of data items to be processed by the ML model, each pair of data items comprising a conditioning vector that represents an individual user and an input data item (step S100); and training the ML model by jointly: training the first neural network of the ML model to transform weights of at least one layer of the second neural network into personalized weights for individual users using the conditioning vector of the pairs of data items (step S104); and training the second neural network of the ML model to process the input data item of the pairs of data items using the personalized weights for the at least one layer, and to generate output data (step S106).

As the first and second neural networks are trained jointly, the weights of the first neural network and second neural network may be randomly initialized at the start of the training process. Thereafter, the weights of both neural networks will be determined during the training process.

Training the ML model may comprise training the first neural network to generate personalized weights that cause the second neural network to generate output data that best matches a ground truth. That is, the training continues until the first neural network generates weights that enable the second neural network to process input data and generate output data that is of a satisfactory quality or accuracy. This quality or accuracy may be user-defined or pre-defined.

Training the first neural network may comprise training the first neural network to learn a function that transforms the weights to personalized weights. As explained in more detail below, the personalized weights may vary depending on the input data and/or the conditioning vector. Thus, the first neural network may learn a function that transforms a conditioning vector into personalized weights.

In addition to personalising the weights (and biases) of at least one layer of the second neural network based on conditioning vectors, the present techniques may further personalise the weights (and biases) based on hardware and/or performance constraints, as described above. Thus, the process may comprise receiving at least one constraint (step S102).

Figure 8:
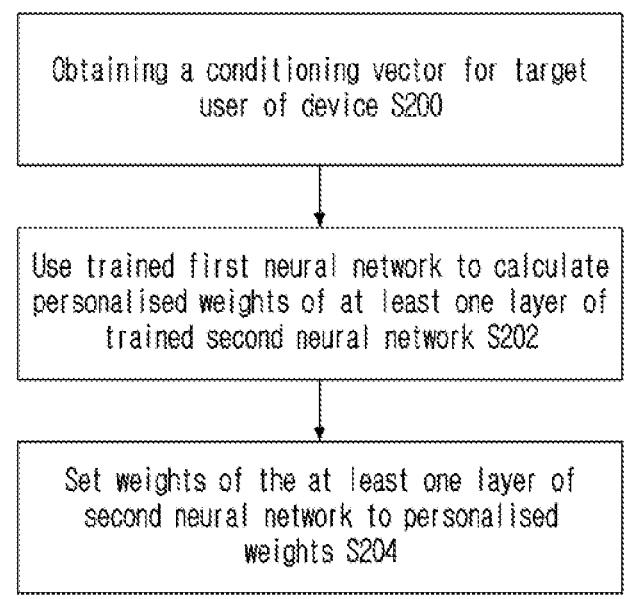
FIG. 8 is a flowchart of example steps of an enrolment process that may be performed on-device prior to using the trained ML model of the present techniques.

FIG. 8 is a flowchart of example steps of an enrolment process that may be performed on-device prior to using the trained ML model of the present techniques. The process may comprise: obtaining a conditioning vector for the target user of the user device (step S200); using the first neural network to calculate the personalized weights of at least one layer of the second neural network using the conditioning vector (step S202); and setting weights of at least one layer of the second neural network to the personalized weights (step S204). This process only needs to be performed once per user per device.

Figure 9:
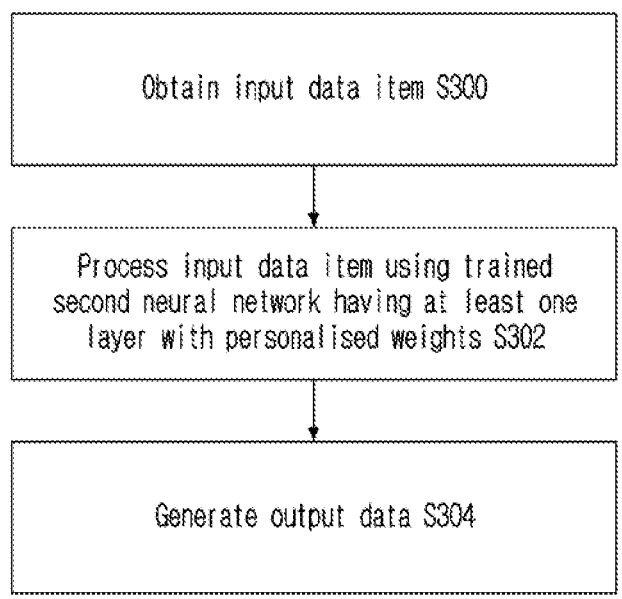
FIG. 9 is a flowchart of example steps of a method to use a trained ML model on-device.

FIG. 9 is a flowchart of example steps of a method to use a trained ML model on-device, where the trained machine learning, ML, model has a first neural network and a second neural network. The method comprises: obtaining an input data item (step S300); and processing the input data item using the second neural network, the second neural network comprising at least one layer having personalized weights that are personalized for a target user of the user device (step S302), and thereby generating output data (step S304).

Figure 10:
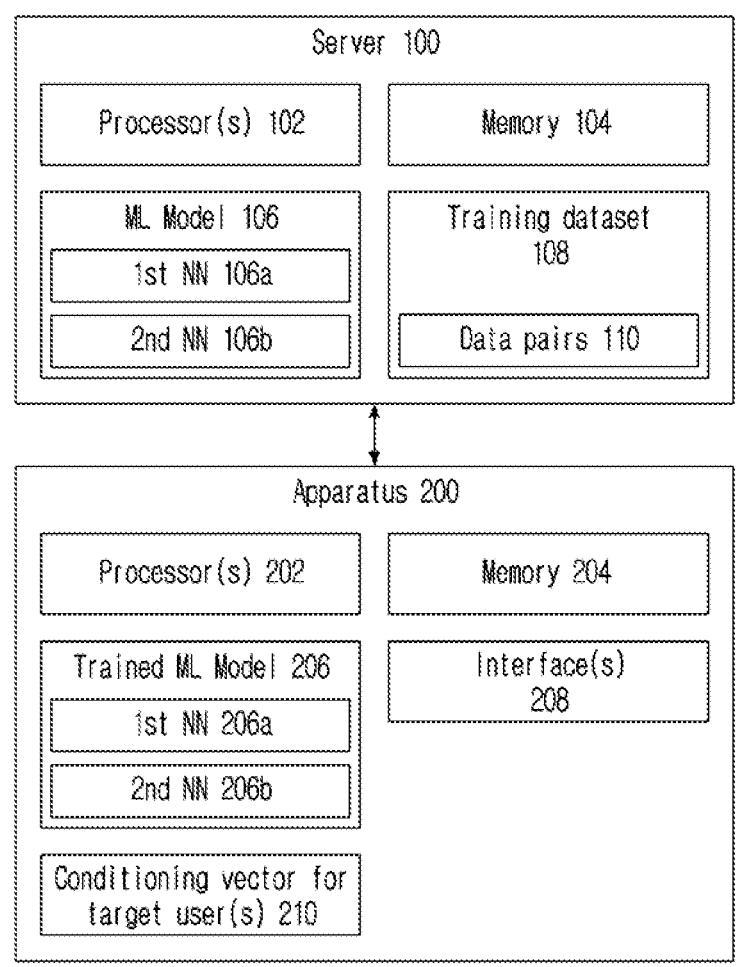
FIG. 10 is a block diagram of a system to train the ML model and to use the trained ML model.

FIG. 10 is a block diagram of a system to train the ML model and to use the trained ML model. The system comprises a server 100 comprising at least one processor 102 coupled to memory 104. The server 100 comprises a ML model 106 comprising a first neural network 106a and a second neural network 106b. The at least one processor 102 is arranged to: obtain a training dataset 108 comprising a plurality of pairs of data items 110 to be processed by the ML model, each pair of data items comprising a conditioning vector that represents an individual user and an input data item; and train the ML model by jointly: training the first neural network 106a of the ML model to transform weights of at least one layer of the second neural network 106b into personalized weights for individual users using the conditioning vector of the pairs of data items; and training the second neural network 106b of the ML model to process the input data item of the pairs of data items using the personalized weights for the at least one layer, and to generate output data.

The system comprises an apparatus 200 comprising at least one processor 202 coupled to memory 204. The apparatus is arranged to receive a trained ML model 206 from the server, the trained ML model 206 having a first neural network 206a and a second neural network 206b. The at least one processor 202 may be arranged to: obtain an input data item; and process the input data item using the second neural network 206b, the second neural network 206b comprising at least one layer having personalized weights that are personalized for a target user of the apparatus 200, and thereby generating output data.

The processor 202 may be arranged to: obtain a conditioning vector 210 for the target user of the user device; use the first neural network 206a to calculate the personalized weights of at least one layer of the second neural network 206b using the conditioning vector; and setting weights of at least one layer of the second neural network 206b to the personalized weights.

The apparatus 200 may be any one of: a smartphone, tablet, laptop, computer or computing device, virtual assistant device, a robot or robotic device, a robotic assistant, image capture system or device, an Internet of Things device, and a smart consumer device. It will be understood that this is a non-limiting and non-exhaustive list of apparatuses. It will be understood that the conditioning of the neural network could be performed on the same device, or could be performed on a different device and downloaded for use by the apparatus 200.

The at least one processor 202 may comprise one or more of: a microprocessor, a microcontroller, and an integrated circuit. The memory 204 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 200 comprises at least one interface 208 for receiving input data items (to be processed by a conditioned neural network), and possibly reference data items (to generate conditioning vectors for conditioning a neural network). The interface 208 may be, for example, a display, an image capture device, a microphone, a sound speaker, etc. The at least one interface 208 may be used to obtain the at least one training data item used to personalise the trained neural network 206.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for training, on a server, a machine learning, ML, model having a first neural network and a second neural network, the method comprising:
 obtaining a training dataset comprising a plurality of pairs of data items to be processed by the ML model, each pair of data items comprising a conditioning vector computed from data associated with an individual user and an input data item comprising a plurality of samples, wherein a sample from among the plurality of samples is a text sample or an audio sample; and
 training the ML model by jointly:
  training the first neural network of the ML model to alter weights of at least one layer of the second neural network to personalize the weights for individual users using the conditioning vector of the pairs of data items; and
  training the second neural network of the ML model to process the input data item of the pairs of data items using the personalized weights for the at least one layer, and to generate output data using the personalized weights.

2. The method as claimed in claim 1, wherein training the ML model comprises training the first neural network to generate personalized weights that cause the second neural network to generate output data that best matches a ground truth.

3. The method as claimed in claim 1, wherein weights of the first neural network and second neural network are randomly initialized.

4. The method as claimed in claim 1, wherein training the first neural network comprises training the first neural network to learn a function that alters the weights such that the weights are personalized.

5. The method as claimed in claim 1, further comprising receiving at least one constraint, and wherein training the ML model further comprises using the received at least one constraint to train the first and second neural networks to generate output data.

6. The method as claimed in claim 5, wherein the at least one constraint is any one or more of: a hardware constraint, a computational capability, an inference latency, and an inference energy consumption.

7. The method as claimed in claim 5, wherein using the received at least one constraint to train the ML model to generate output data comprises restricting values of the personalized weights to be within a predefined range.

8. The method as claimed in claim 1, wherein:
the ML model is for sound enhancement and/or automatic speech recognition;
the input data item of each pair of data items comprises at least one audio noise sample and at least one clean audio sample that each contain speech of individual speakers; and
the conditioning vector is a speaker embedding vector for each individual speaker.

9. The method as claimed in claim 8, wherein training the ML model comprises training the second neural network to remove the noise from the corrupted audio samples while maintaining the speech of the individual speakers.

10. The method as claimed in claim 8, further comprising generating the speaker embedding vector for each individual speaker by:
obtaining at least one clean audio signal for an individual speaker; and
applying a speaker recognition model to the at least one clean audio signal to generate a speaker embedding vector representing a speech profile of the individual speaker.

11. The method as claimed in claim 1, wherein:
the ML model is for text-to-speech conversion;
the input data item of the pairs of data items comprises at least one text sample and a corresponding audio sample; and
the conditioning vector is an embedding vector representing a target voice for the speech.

12. A server for training a machine learning, ML, model having a first neural network and a second neural network, the server comprising:
at least one processor coupled to memory and arranged to:
obtain a training dataset comprising a plurality of pairs of data items to be processed by the ML model, each pair of data items comprising a conditioning vector computed from data associated with an individual user and an input data item comprising a plurality of samples, wherein a sample from among the plurality of samples is a text sample or an audio sample; and
train the ML model by jointly:
training the first neural network of the ML model to alter weights of at least one layer of the second neural network to personalize the weights for individual users using the conditioning vector of the pairs of data items; and
training the second neural network of the ML model to process the input data item of the pairs of data items using the personalized weights for the at least one layer, and to generate output data using the personalized weights.

13. A computer-implemented method for training, on a server, a machine learning, ML, model having a first neural network and a second neural network, the method comprising:
obtaining a training dataset comprising a plurality of pairs of data items to be processed by the ML model, each pair of data items comprising a conditioning vector that represents an individual user and an input data item; and
training the ML model by jointly:
training the first neural network of the ML model to transform weights of at least one layer of the second neural network into personalized weights for individual users using the conditioning vector of the pairs of data items; and
training the second neural network of the ML model to process the input data item of the pairs of data items using the personalized weights for the at least one layer, and to generate output data,
wherein the computer-implemented method further comprises receiving at least one constraint, and wherein training the ML model further comprises using the received at least one constraint to train the first and second neural networks to generate output data, and
wherein using the received at least one constraint to train the ML model to generate output data comprises restricting values of the personalized weights to be within a predefined range.

* * * * *